(12) United States Patent
Pauly et al.

(10) Patent No.: US 11,348,008 B2
(45) Date of Patent: May 31, 2022

(54) METHOD AND COMPUTER FOR DETERMINATION OF A TRAINING FUNCTION FOR GENERATING ANNOTATED TRAINING IMAGES

(71) Applicant: Siemens Healthcare GmbH, Erlangen (DE)

(72) Inventors: Olivier Pauly, Munich (DE); Philipp Seegerer, Fuerstenzell (DE)

(73) Assignee: Siemens Healthcare GmbH, Erlangen (DE)

( * ) Notice: Subject to any disclaimer, the term of this patent is extended or adjusted under 35 U.S.C. 154(b) by 40 days.

(21) Appl. No.: 15/845,389

(22) Filed: Dec. 18, 2017

(65) Prior Publication Data

US 2018/0174049 A1 Jun. 21, 2018

(30) Foreign Application Priority Data

Dec. 19, 2016 (EP) ..................... 16205059

(51) Int. Cl.
*G06N 3/08* (2006.01)
*G06K 9/62* (2022.01)
(Continued)

(52) U.S. Cl.
CPC ........... *G06N 3/082* (2013.01); *G06K 9/6256* (2013.01); *G06N 3/0454* (2013.01); *G06N 3/084* (2013.01); *G06T 7/0012* (2013.01); *G06T 7/11* (2017.01); *G06V 10/454* (2022.01); *G06V 30/194* (2022.01); *G06T 2207/20081* (2013.01); *G06T 2207/20084* (2013.01); *G06V 2201/03* (2022.01)

(58) Field of Classification Search
CPC ...... G06N 3/082; G06N 3/0454; G06N 3/084; G06K 9/66; G06K 9/6256; G06K 9/4628; G06K 2209/05; G06T 7/11; G06T 7/0012; G06T 2207/20084; G06T 2207/20081
See application file for complete search history.

(56) References Cited

U.S. PATENT DOCUMENTS

| 10,319,094 B1 * | 6/2019 | Chen ........................ G06N 3/08 |
| 2003/0194124 A1 * | 10/2003 | Suzuki .................. G06T 7/0012 382/156 |

(Continued)

OTHER PUBLICATIONS

Goodfellow, et al.: "Generative adversarial nets";: Advances in Neural Information Processing Systems,(2014).

(Continued)

*Primary Examiner* — John W Lee
(74) *Attorney, Agent, or Firm* — Banner & Witcoff Ltd.

(57) ABSTRACT

In a method and a computer for determining a training function in order to generate annotated training images, a training image and training-image information are provided to a computer, together with an isolated item of image information that is independent of the training image. A first calculation is made in the computer by applying an image-information-processing first function to the isolated item of image information, and a second calculation is made by applying an image-information-processing second function to the training image. Adjustments to the first and second functions are made based on these calculation results, from which a determination of a training function is then made in the computer.

14 Claims, 6 Drawing Sheets

(51) Int. Cl.
*G06T 7/00* (2017.01)
*G06N 3/04* (2006.01)
*G06V 10/44* (2022.01)
*G06V 30/194* (2022.01)
*G06T 7/11* (2017.01)

(56) References Cited

U.S. PATENT DOCUMENTS

| | | | | |
|---|---|---|---|---|
| 2005/0084156 | A1* | 4/2005 | Das | G06V 10/255 |
| | | | | 382/224 |
| 2005/0232478 | A1* | 10/2005 | Onishi | G06T 7/0004 |
| | | | | 382/149 |
| 2012/0269441 | A1* | 10/2012 | Marchesotti | G06T 7/0002 |
| | | | | 382/195 |
| 2015/0036919 | A1* | 2/2015 | Bourdev | G06Q 50/01 |
| | | | | 382/156 |
| 2015/0238148 | A1* | 8/2015 | Georgescu | G06T 7/0012 |
| | | | | 600/408 |
| 2016/0140425 | A1* | 5/2016 | Kulkarni | G06K 9/4628 |
| | | | | 382/159 |
| 2016/0358337 | A1 | 12/2016 | Dai et al. | |
| 2017/0220903 | A1* | 8/2017 | Hertzmann | G06V 10/426 |

OTHER PUBLICATIONS

Candel et al.: "Deep Learning with H2O"; published by H2O (2015).
Maxime et al.: "Learning and Transferring Mid-Level Image Representations using Convolutional Neural Networks"; in: 2014 IEEE Conference on Computer Vision and Pattern Recognition; pp. 1717-1724; (2014).
Zhao, et al.: "Stacked What-Where Auto-Encoders"; Workshop Track ICLR, pp. 1-12; (2016).
Kingma, et al.: "Auto-encoding Variational Bayes";: pp. 1-14; (2014).
Milletari, et.al. "Hough-CNN: Deep Learning for Segmentation of Deep Brain Regions in MRI and Ultrasound"; Preprint submitted to Pattern Recognition; pp. 1-34; (2016).
Alzu'Bi et al.: "Semantic content-based image retrieval: A comprehensive study", Journal of Visual Communication and Image Representation, vol. 32; pp. 20-54;( 2015).
Van Den Oord, et al.: "Pixel Recurrent Neural Networks", JMLR W & CP; vol. 48; (2016).
Zhao, et al.: "Energy-based Generative Adversarial Networks", arXiv preprint pp. 1-16; (2016).

* cited by examiner

METHOD AND COMPUTER FOR DETERMINATION OF A TRAINING FUNCTION FOR GENERATING ANNOTATED TRAINING IMAGES

BACKGROUND OF THE INVENTION

Field of the Invention

The present invention concerns a method for determining a training function for generating annotated training images, as well as a computer for implementing such a method.

Description of the Prior Art

In machine-based image processing and image classification, there has been great progress in the use of so-called "deep learning" algorithms, wherein the algorithms have been trained using very large volumes of data. Examples of such algorithms are "deep artificial neural networks" ("deep ANNs") or "deep convolutional artificial neuronal networks" ("deep convolutional ANNs"). Very large volumes of data are provided by publically accessible databases, in particular image databases such as "ImageNet".

The use of such algorithms in machine-based image processing or in image classification can achieve better quality and performance than a human. This means, for example, that for the same task, machine-based image classifiers produce a lower error rate than an average human classifier and at the same time, the image classification is performed more quickly.

These technologies can also be used in the field of medical image analysis, for example for the detection and segmentation of organs, anatomical structures, lesions and other pathologies that are usually detectable with "computer-aided diagnosis" (CAD).

Although great advances in medicine can be expected from the use of "deep learning", the specific use of artificial neural networks remains a great challenge since annotated training data usually are not available in sufficient amounts. Annotation can be provided by marking a region by a square window or segmentation or by text and/or numerical comments on the image, which, for example, indicate a specific diagnosis in the image.

Annotation of medical image data is a tedious and monotonous task but nevertheless has to be performed by healthcare professionals, for example a radiologist. This makes the generation of annotated medical image data particularly time-consuming and costly.

From the publication Ian J. GOODFELLOW, "Generative Adversarial Networks", arxiv 1406.2661 (2014) is a method known for the generation of image data that appears similar to a defined training volume of images by means of "generative adversarial networks" ("GAN"). Herein, two artificial neural networks with contradictory tasks are used. However, this method is not able to generate annotated training image data.

SUMMARY OF THE INVENTION

An object of the present invention is to provide a method for generating a training function for the rapid and inexpensive generation of annotated image data for training self-learning algorithms.

The inventive method is described below, but features, advantages and alternative embodiments mentioned with regard to the method are applicable to the other aspects of the invention. The relevant functional features of the method are embodied as appropriate physical modules in the computer.

The inventive method includes a first reception of a training image, and an item of training-image information, via an interface of a computer, wherein the training-image information is image information belonging to the training image. The inventive method furthermore includes a second reception of an isolated item of image information via the interface, wherein the isolated item of image information is independent of the training image. A first calculation is made in the computer of a first result of an image-information-processing first function when applied to the isolated item of image information. Furthermore, a second calculation is made in the computer of a second result of an image-information-processing second function when applied to the training image. Furthermore, the computer makes an adjustment of a parameter of the image-information-processing first function and/or the image-processing second function based on at least the first result and the second result. Furthermore, the computer makes a determination of a training function based on the image-information-processing first function. The computer applies the training function to an item of image information, so as to generate an associated image, which is provided as an output from the computer.

The invention is based on the insight that the use of an image-information-processing second function as the basis of the training function enables training images to be generated not only from random data, but also from data with an information content. At the same time, this procedure generates annotated training data because input into such a training function is simultaneously the annotation of the output of the training function.

The use of the first result and the second result for the adjustment of the parameters of the first and second function enables a particularly good evaluation of the progress of the training and hence the determination of the training function in very few iteration steps.

According to a further embodiment of the invention, the first function and/or the second function are defined by an artificial neural network and the parameters of the artificial neural network furthermore comprise the edge weights of the artificial neural network. A function defined by an artificial neural network is particularly suitable for adjustment to training data.

According to a further embodiment of the invention, the adjustment of the edge weights is performed by minimizing a cost function by means of backpropagation. The use of a cost function enables the efficient acquisition of the difference of the output of an artificial neural network from the comparison value. The cost function can be minimized particularly quickly by backpropagation.

According to a further embodiment of the invention, an item of image information of an image comprises segmentation of the image into at least one image region. Manual segmentation of training data is particularly time-consuming and the determination of a training function for this task significantly accelerates the creation of annotated training data.

According to a further embodiment of the invention, the item of image information of the image is a variable that assesses whether a defined object or number of defined objects, is/are depicted in the image. The item of image information can also be a property of an object. Simple image information of this kind requires very few training images and items of training image information for the determination of the training function.

According to a further embodiment of the invention, the image-information-processing first function is a generator function that, when applied to the item of image information, generates an associated image as an output. The image-processing second function is a classification function that, when applied to the image, generates an associated item of image information as an output. The first result is a calculated image and the second result is a first item of calculated image information. The training function is the image-information-processing first function. The method furthermore includes a third calculation of a second item of calculated image information by applying the image-processing function to the calculated image. This choice of the first and the second function causes the training function to be obtained particularly simply and quickly from the second function. Furthermore, the image-processing second function can already be used as a pretrained function for the training with the annotated image data calculated by the training function.

According to a further embodiment of the invention, the first item of calculated image information is an estimation of a first probability of the training image being contained in a set of training images and, in addition, the second item of calculated image information is an estimation of a second probability of the calculated image being contained in a set of training images. The use of image information of this kind enables particularly good determination of a training function that generates images similar to the training images.

According to a further embodiment of the invention, the cost function is based on at least a first difference of the first calculated image information from the training-image information. As a result of the inclusion of this difference in the cost function, the second function is trained to calculate an item of image information of an input image particularly accurately.

According to a further embodiment of the invention, the cost function is furthermore based on at least a second difference of the second item of calculated image information from the isolated item of image information. As a result of the inclusion of this difference in the cost function, the second function is trained to calculate an item of image information of an input image particularly accurately, and simultaneously the first function is trained to generate suitable calculated images from isolated items of image information.

According to a further embodiment of the invention, the image-information-processing first function is an information autoencoder that when applied to a first item of image information, generates a second item of image information as an output. The image-processing second function is an image autoencoder that when applied to a first image, generates a second image as an output. Furthermore, the central layer of the information autoencoder and the central layer of the image autoencoder have the same number of central nodes. The first result corresponds to first node values, wherein the first node values are the values of the nodes of the central layer of the information autoencoder when the isolated item of image information is the input value of the information autoencoder. The second result corresponds to second node values, wherein the second node values are the values of the nodes of the central layer of the image autoencoder when the training image is the input value of the image autoencoder. The method furthermore includes a fourth calculation of third node values, wherein the third node values are the values of the nodes of the central layer of the information autoencoder when the training-image information is the input value of the information autoencoder. In this case, the training function is composed of the first part of the information autoencoder and the second part of the image autoencoder. The use of an image autoencoder and an information autoencoder enables the parameters of the first function and/or the second function to be determined particularly quickly since, with an autoencoder, the predicted output for each input value is known since the predicted output is identical to the input value. Furthermore, the node values of the central layers of the image autoencoder and the information autoencoder can be used to establish a relationship between an image and an item of image information when the central layers are of the same size.

According to a further embodiment of the invention, a distance between the first node values and the second node values makes a negative contribution to the cost function, and a distance between the second node values and the third node values makes a positive contribution to the cost function. When the image autoencoder is applied to a training image and an information autoencoder to the associated training-image information, such a choice of cost function and the adjustment of the parameters of the first and the second function based thereupon causes the node values of the central layer to be particularly similar, but simultaneously, when the image autoencoder is applied to a training image and the information autoencoder to an isolated item of image information, the node values have a particularly large distance. Therefore, image information can be assigned particularly well to associated images and vice versa.

According to a further embodiment of the invention, the training function generates an image as an output from the item of image information as an input value, such that the item of image information is used as an input value of the information autoencoder. The node values of the central layer of the information autoencoder are transferred to the node values of the central layer of the image autoencoder and the output of the training function corresponds to the resulting output of the image autoencoder. This choice of training function and the similarity of the central node values of images and associated image information enable annotated training data to be generated particularly simply.

Furthermore, the invention relates to a function-determining computer that includes the following.

An interface is configured for the first reception of a training image, and an item of training-image information, wherein the training-image information is image information for the training image. The interface is also configured for the second reception of an isolated item of image information, wherein the isolated item of image information is independent of the training image. A processor is configured for the first calculation of a first result of an image-information-processing first function when applied to the isolated item of image information, and for the second calculation of a second result of an image-processing second function when applied to the training image. The processor is also configured for the adjustment of a parameter of the image-information-processing first function and/or the image-processing second function based on at least the first result and/or the second result. The processor is also configured for determining a training function based on the image-information-processing first function that, when applied to an item of image information, generates an associated image as an output of the computer.

Such a function-determining computer is designed to implement the above-described method according to the invention, and the embodiments thereof.

The present invention also encompasses a non-transitory, computer-readable data storage medium encoded with programming instructions, said storage medium being loadable into a computer and said programming instructions then causing said computer to implement the method in accordance with the invention, as described immediately above.

It is furthermore the object of the present invention to generate annotated image data for training self-learning algorithms in a quick and cost-effective manner.

To achieve this object, in a further embodiment of the invention training data are generated according to the method described above, and annotated training data are generated by applying the training function to an item of input-image information by the computer (the processor thereof).

Furthermore, the invention can relate to a data generator that includes the interface and the processor of the function-determining computer, wherein the computing unit is furthermore configured to generate annotated training data by applying the training function to an item of input-image information.

Such a data generator is designed to implement the above-described method according to the invention and the embodiments thereof.

The present invention also encompasses a non-transitory, computer-readable data storage medium encoded with programming instructions, said storage medium being loadable into a computer and said programming instructions then causing said computer to implement the method in accordance with the invention, as described immediately above.

An image is a two-dimensional arrangement of two-dimensional pixels or an N-dimensional arrangement of N-dimensional voxels, wherein N is greater than or in particular equal to 3. In this case, a pixel or a voxel comprises at least one intensity value. In this case, an intensity value can be an overall intensity or an intensity of one color channel out of a number of color channels.

An item of image information characterizes an image, a part of an image or an object depicted in the image. An item of image information can be the presence or absence of a defined object in the image. Furthermore, an item of image information can be the probability of an image originating from a distribution of training images or being similar to a set of images. Furthermore, an item of image information can be a mask defined by a region of the image. Furthermore, an item of image information can be segmentation of an image into one or more regions. Herein, a mask defines segmentation of the image into precisely two regions, wherein the first region corresponds to the mask and the second region to the parts of the image outside the mask.

An isolated item of image information is independent of a training image when the isolated item of image information is not an item of image information from the training image. An isolated item of image information independent of a training image and training-image information can be an item of image information that was generated synthetically. A synthetically generated item of image information is in particular not extracted from an associated image. However, it can also be an item of image information from an image other than the training image.

An image-processing function is a function that obtains as an input value at least one image, in particular a two-dimensional image or a three-dimensional image, and converts it into an output. In this case, the output can furthermore depend upon a set of parameters of the image-processing function. In addition to the image, the input value of the image-processing function can include further variables. Image-processing functions are in particular "convolutional artificial neural networks".

An image-information-processing function is a function that obtains, as an input value, an item of image information and converts it into an output. In this case, the output can furthermore depend upon a set of parameters of the image-information-processing function. In addition to the image information, the input value of the image-information-processing function can also include further variables; in particular the input value can be a set of random variables.

An autoencoder is an artificial neural network constructed from layers, which depicts an input value on an output similar to the input value. In this case, the autoencoder comprises at least one input layer, an output layer with the same number of nodes as the input layer and a central layer between the input layer and the output layer with fewer nodes than the input layer. The nodes of the input layer are assigned to the input data in the same way as the assignment of the nodes of the output layer to the output data. The autoencoder can include further layers, furthermore, the autoencoder can be constructed symmetrically about the central layer. The lower number of nodes in the central layer compared to the input and output layer results in the compression of the input data and decompression of the compressed input data to form the output data. Therefore, adjustment of at least the edge weights using training data enables an autoencoder to learn a compression method and a decompression method.

DESCRIPTION OF THE PREFERRED EMBODIMENTS

Figure 1:
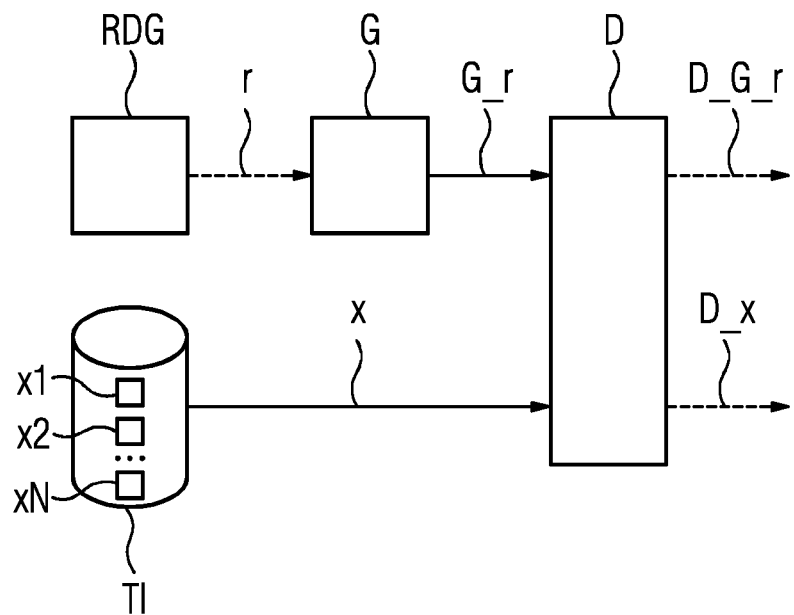
FIG. 1 is a schematic depiction of a method from the prior art for the determination of a training function.

FIG. 1 is a schematic depiction of a method for the determination of a training function from the prior art. This method is described in the publication: Ian J. GOODFELLOW, "Generative Adversarial Networks", arxiv 1406.2661 (2014).

The method is based on a set x1, x2, . . . , xN of training images stored in a database TI. An image-processing second function D is applied to a training image x from the set x1, x2, . . . , xN of training images, wherein the image-processing second function D depicts an image x on a probability D_x of the training image x being contained in the set x1, x2, . . . , xN of training. Furthermore, a data-processing function G is applied to a vector r of random numbers and generates a calculated image G_r, wherein the vector r of random numbers is generated by a random-number generator RDG. The image-processing second function D is also applied to the calculated image G_r and estimates the probability D_G_r of the image G_r being selected from the set x1, x2, . . . , xN of training data.

Furthermore, two cost functions, which are dependent upon D_G_r and D_x, are minimized by the adjustment of parameters of the first function G and the second function D. A suitable choice of cost function causes the first function G to be trained such that the image-processing second function D is not able to decide whether G_x is selected from the set x1, x2, . . . , xN of training data, i.e. D_G_x=0.5.

Figure 2:
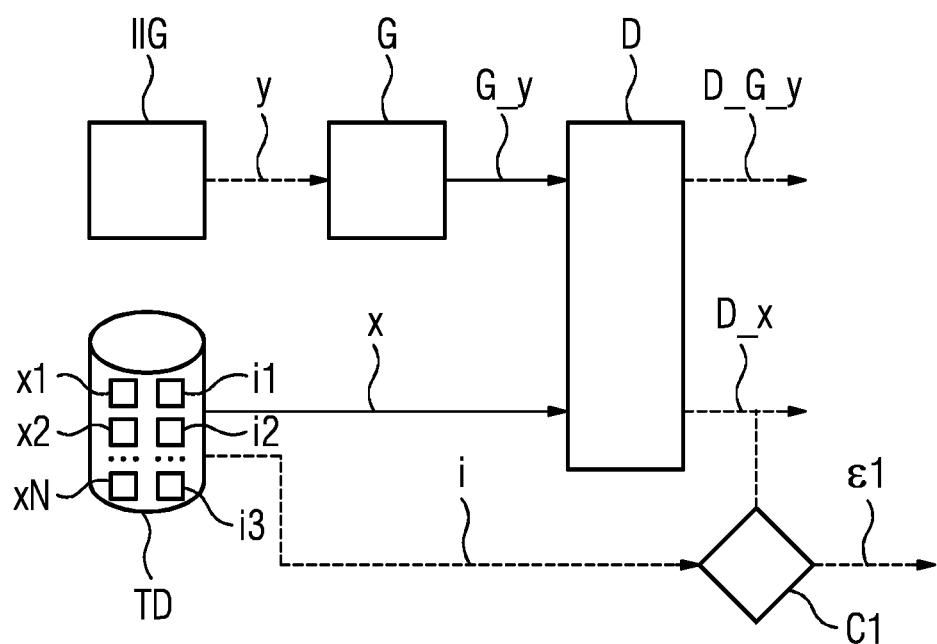
FIG. 2 is a schematic depiction of a first exemplary embodiment of a method for the determination of a training function.

FIG. 2 shows a first exemplary embodiment of a method for determining a training function. Herein, the image-information-processing first function G and the image-processing second function D are each embodied as an artificial neural network ANN and the parameters of the first function G and the second function D are defined by the edge weights of the artificial neural network ANN. However, the first function G and the second function D can also be defined by other combinations of basic functions defined by parameters, for example as a combination of a Fourier basis or as a combination of polynomials.

In this exemplary embodiment, an item of image information is defined by a binary variable that specifies whether an image contains a predefined feature, in this example a fracture in a bone depicted in an X-ray image. It is also possible to use other predefined features, other items of image information and other images.

In this exemplary embodiment, a training database TD comprises training images x1, x2, . . . , xN of human bones with associated training image information i1, i2, . . . , iN. Here, the items of training image information i1, i2, . . . , iN are in each case a binary variable, which indicates whether the bone depicted in the associated training image has a fracture. A training image x is selected from the training images x1, x2, . . . , xN and the second function D is applied thereto. In this exemplary embodiment, the first item of calculated image information D_x is a two-dimensional vector with entries between 0 and 1, wherein the first vector entry indicates the degree of probability of the training image x being a real image or an image from the training database TD and wherein the second vector entry indicates the degree of probability of the depicted bone having a bone fracture.

Furthermore, in the exemplary embodiment shown, a generator IIG generates a pair consisting of a random vector and an isolated item of image information y, wherein the isolated item of image information y is also a binary variable. In this example, a random vector is an image with pixels the intensity of which is randomly distributed in accordance with a uniform distribution between a minimum value and a maximum value. However, the intensity of the pixels can also be distributed in accordance with another distribution, for example in accordance with a normal distribution. The first function G generates a calculated image G_y from the random vector and the isolated item of image information y. The second function D is applied to this calculated image G_y; in this exemplary embodiment, the second item of calculated image information D_G_y is a two-dimensional vector with entries between 0 and 1, wherein the first entry indicates the degree of probability of the calculated image G_y being contained in the training database TD and wherein the second entry indicates the degree of probability of the depicted bone having a bone fracture.

In this exemplary embodiment, the parameters of the first function G and the second function D are adjusted by minimizing the cost functions $K_G$ and $K_D$ by backpropagation. Those skilled in the art are familiar with backpropagation for artificial neural networks and therefore a more detailed description is not necessary herein. The cost function is in each case based on the first component of the first calculated image function D_x and the second item of calculated image information D_G_y, wherein here the contributions to the cost function are defined by the binary cross entropy $$BCE(z,z') \propto z' \cdot \log(z) + (1-z') \cdot \log(1-z)$$

wherein z is the calculated value of the variable and z' is the actual value of the variable. Therefore, the cost functions are obtained as $$K_D = BCE(D\_x,1) + BCE(D\_G\_y,0) \propto \log(D\_x) + \log(1 - D\_G\_y)$$

$$K_G = BCE(D\_G\_y,1) \propto \log(D\_G\_y)$$

wherein in each case only the first component of the first calculated image information D_x and the second item of calculated image information D_G_y is used. Therefore, the two cost functions $K_D$, $K_G$ have alternating components so that, when both cost functions are minimized, the first function G and the second function D are trained to overcome one another. Other cost functions $K_D$, $K_G$ having this property are also possible.

An optional comparison of the image information i of the training image x and the second component of the first calculated image information D_x by means of a comparison function C1 depicted in this exemplary embodiment enables the amount of the difference ε1 between the variables to be calculated. The amount of the difference ε1 makes a positive contribution to the cost function KD for the second function D; in particular this cost function KD increases as the amount of the difference ε1 increases, in particular the contribution to the cost function can also be defined by binary cross entropy so that minimization of the cost function KD also causes the amount of the difference ε1 to be minimized.

Figure 3:
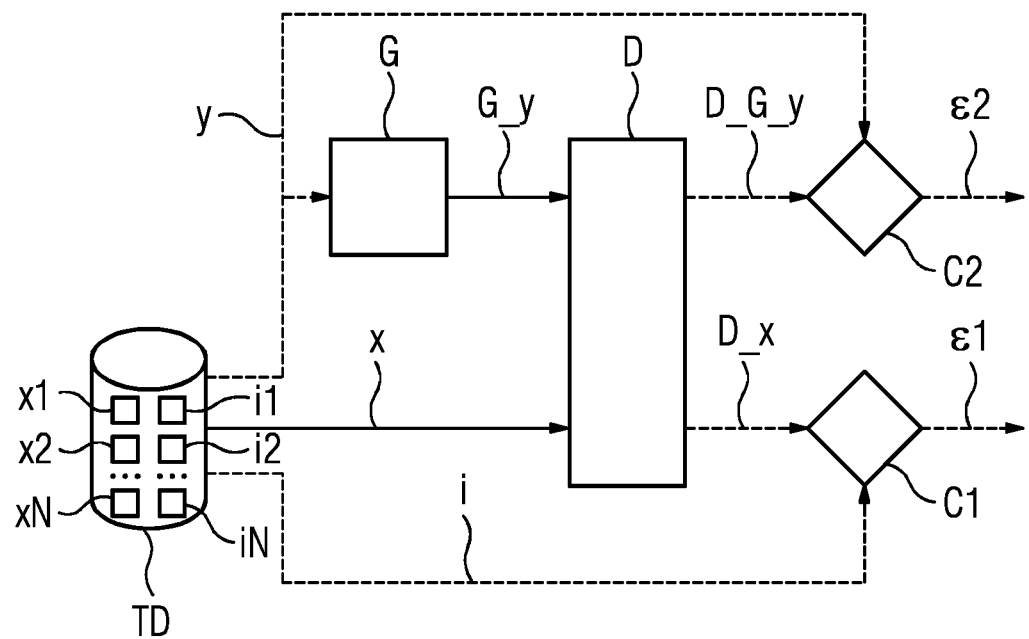
FIG. 3 is a schematic depiction of a second exemplary embodiment of a method for the determination of a training function.

FIG. 3 is a schematic depiction of a second exemplary embodiment of a method for the determination of a training function. This second exemplary embodiment includes the same elements as the first exemplary embodiment of the method in accordance with FIG. 2, so reference is made to the description of the schematic depiction of FIG. 2 with respect to elements that are the same.

In this exemplary embodiment, an item of image information of an image is a segmentation of a region of interest, here a tumor in an image of the tumor. In this exemplary embodiment, a segmentation of an image is defined in that a pixel that can be considered to be part of the tumor is assigned the value 1 in the segmentation. A pixel that cannot be considered to be part of the tumor is assigned the value 0 in the segmentation. Such an item of image information can equivalently also be understood to be a mask of the tumor.

In this exemplary embodiment, a training database TD includes training images x1, x2, ..., xN with associated segmentations i1, i2, ..., iN. A training image x selected from the training images x1, x2, ..., xN and the second function D is applied thereto. In this exemplary embodiment, the first item of calculated image information D_x is a segmentation of the training image x. In this exemplary embodiment, the isolated item of image information y is a segmentation of a training image x1, x2, ..., xN, wherein the training image x1, x2, ..., xN associated with the isolated item of image information is not identical to the training image x. It is also possible to generate an artificial segmentation.

In addition to the isolated segmentation y, in this exemplary embodiment, the first function G furthermore obtains as an input a random vector; this is not shown in FIG. 3, for clarity. In this example, the random vector is a random image, wherein the random image has the same number of pixels as the training images x1, x2, ..., xN, and wherein each pixel is equally distributed between a minimum value and a maximum value. However, other random images or random vectors are also conceivable, for example normally distributed pixels. The first function G generates a calculated image G_y from the random vector and the isolated segmentation y. The second function D is applied to this calculated image G_y; in this exemplary embodiment, the second item of calculated image information D_G_y is a segmentation of the calculated image G_y.

In the exemplary embodiment depicted, the first calculated segmentation D_x is compared with the training-image information i by a first comparator unit C1, furthermore the second calculated segmentation D_G_y is compared with the isolated segmentation y by a second comparator unit C2. In this case, the comparator unit C1 calculates a first difference ε1, and the second comparator unit C2 calculates a second difference ε2. In the exemplary embodiment shown, the first difference ε1 between the first calculated segmentation D_x and the training-image information is defined by the Sørensen-Dice coefficient SDC(D_x,i), where $$SDC(x, y) = \frac{2\Sigma_j x_j y_j}{\Sigma_j x_j^2 + \Sigma_j y_j^2}$$

Instead of the squared pixel values in the denominator it is also possible to use the amounts of the pixel values. However, the form shown of the Sørensen-Dice coefficient has the advantage that the gradient of the cost function required for the backpropagation can be expressed as a closed form expression. The second difference ε2 between the second calculated segmentation D_G_y and the isolated segmentation y is defined by "sum of squared differences" SSD(D_G_y,y) as $$SSD(x,y) = \Sigma_j(x_j - y_j)^2.$$

The differences ε1 and ε2 are then incorporated in the cost function $K_D$ of the second function D and/or the cost function KG of the first function G. It is also possible for the differences ε1 and ε2 to use other functional relationships. The parameters of the first function G and the second function D are then adjusted via minimization of the cost functions $K_G$ and $K_D$ by backpropagation.

In the first exemplary embodiment and in the second exemplary embodiment, depicted in FIG. 2 and FIG. 3, the training function TF is identical to the first image-information-processing function G.

Figure 4:
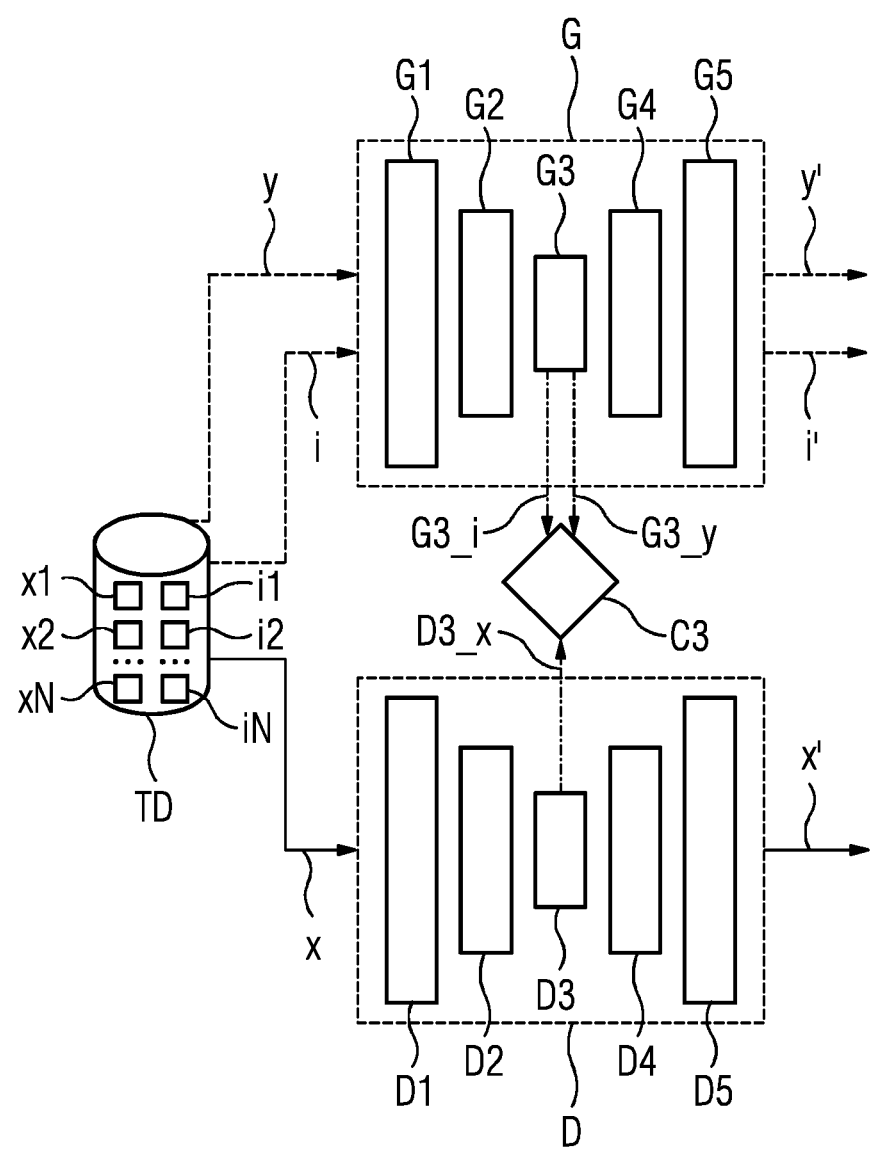
FIG. 4 is a schematic depiction of a third exemplary embodiment of a method for the determination of a training function.

FIG. 4 shows a third exemplary embodiment of a method for the determination of a training function. The third exemplary embodiment partially comprises the same elements as the first exemplary embodiment of the method as shown in FIG. 2, wherein reference is made to the description of the schematic depiction in FIG. 2 in respect of elements which remain the same. In the third exemplary embodiment, the image-processing second function D and the image-information-processing first function G are each implemented by an autoencoder. In this example, both autoencoders comprise 5 node layers G1, ... G5, D1, ... D5, but they can also comprise another, odd, number of node layers. In this exemplary embodiment, the number of nodes in the central layer G3 of the first function G is the same as the number of nodes in the central layer D3 of the second function D.

In the third exemplary embodiment depicted, a training function TF is to be determined, wherein the training function TF determines from a defined segmentation y an associated image TF_y with this segmentation y. Therefore, the training-image information i and the isolated item of image information y can also be understood to be images, wherein a pixel can only assume the values 0 and 1 and wherein the images have the same number of pixels as the training images x1, x2, ..., xN.

In one training step, the second function D obtains a training image x from the set x1, x2, ..., xN of training images as input data and depicts it on an output image x'. In this depiction, the nodes of the central layer D3 have the second node values D3_x. The first function G furthermore obtains the image information i associated with the training image x as input information and depicts this on the output information i'. In this depiction, the nodes of the central layer G3 of the first function G have the third node values G3_i. The first function G furthermore obtains a further isolated item of image information y as input information and depicts this on the output information y', wherein the isolated item of image information y is selected from the set of training image information i1, i2, ..., iN and is different from the training-image information i. In this depiction, the nodes of the central layer G3 of the first function G have the first node values G3_y.

The distance of the training image x from the output image x' and the distance of the training-image information i from the image information I' make a positive contribution to the cost function. Alternatively, the distance of the isolated item of image information y from the image information y' can also make a positive contribution. As a contribution to the cost function in each case the "sum of the pixel-related squared differences" (sum of squared differences is an English technical term; "SSD" for short) of the images x, x' and the image information i, i' and y, y' is used. However, it is also possible to use other distance terms.

Furthermore, the distance of the central node values D3_x from the central node values G3_i makes a positive contribution to the cost function; the distance of the central node values D3_x from the central node values G3_y makes a positive contribution. For the calculation of the distance, the node values D3_x, G3_i, G3_y are understood to be vectors in an n-dimensional vector space, wherein n corresponds to the number of nodes in the central layers D3 and G3 and the j-th value of the vector corresponds to the value of the j-th node in the central layer D3, G3. The distance of the node values is in each case understood to be the sum of the squared differences of the vector components. However, other distance terms are also conceivable, in particular distance terms from an L1-norm (Manhattan metric), from the maximum norm or the minimum norm. The distances are determined by a comparison function C3. The choice of the preceding sign of the contributions to the cost function causes the second node values D3_x and the third node values G3_i in the n-dimensional vector space to lie close to one another, while the second node values D3_x and the first node values G3_y in the n-dimensional vector space are far apart. This causes the image x and the associated image information i of the image x to have similar edge values; non-associated image information y has different edge values.

The cost function is then minimized by backpropagation by the adjustment of the edge weights of the edges between the layers D1, D2, D3, D4, D5 the second function D and the edges between the layers G1, G2, G3, G4, G5 of the first function G, and possibly the edge weights of the input edges of the first function G and the second function D.

Figure 5:
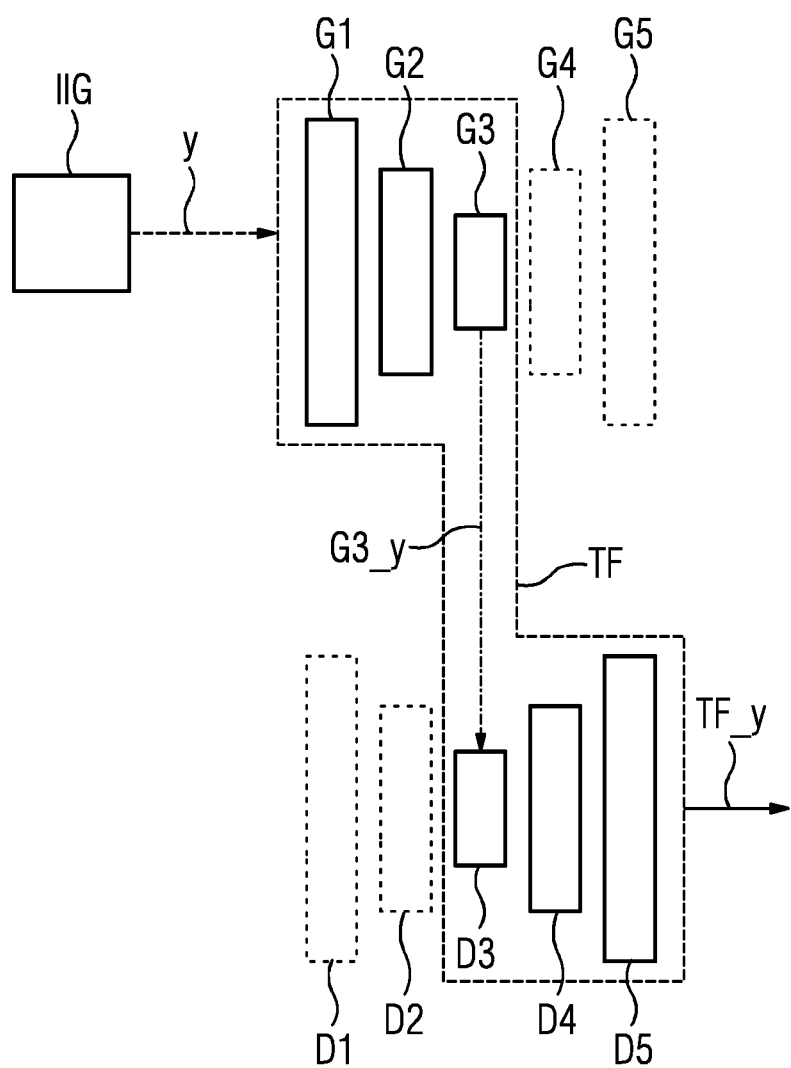
FIG. 5 is a schematic depiction of the training function in the third exemplary embodiment of a method for the determination of a training function.

FIG. 5 is a schematic depiction of the training function TF in the third exemplary embodiment of a method for the determination of a training function. In this example, the training function TF is an artificial neural network ANN comprising the layers G1, G2, G3 of the first function G and the layers D3, D4, D5 of the second function D. Herein, the edges between the layers G1 and G2, the layers G2 and G3, the layers D3 and D4 and the layers D4 and D5 with the respective weights are retained and furthermore the assignment between the isolated item of image information y and the input nodes of the layer G1 are retained. Furthermore, an edge with edge weight 1 is introduced between the j-th nodes of the central layer G3 and the j-th nodes of the central layer D3 and the identity selected as the activation function of the nodes of the central layer D3 so that the value of the j-th node of the central layer D3 always corresponds to the value of the j-th node of the central layer G3 for all node pairs from the central layers G3, D3.

The training function constructed in this way now depicts any image information y desired on an image TF_y containing the image information y. In the exemplary embodiment shown, the image information y is generated by a generator unit IIG.

To determine an isolated segmentation y, it is possible to parameterize structures that typically occur in the training images x1, x2, . . . , xN or the training segmentations i1, i2, . . . , iN by geometric shapes and/or intensity distributions and therefore to determine as many isolated segmentations y as desired. For example, for the identification of breast cancer it is possible to describe vessels and mammary glands as lines, dense regions as ellipses and cancer lesions as structures with peaks. Cancer lesions can also be described by geometric structures originating from a fractal growth process.

In FIG. 1 to FIG. 5, continuous arrows correspond to real images x, x' and calculated images G_r, G_y. Dashed arrows correspond to image information y, i, random vectors r, calculated image information D_x, D_G_y, D_r and differences ε1, ε2 from image information. Dashed-dotted arrows correspond to node values G3_i, G3_y, D3_x of central layers G3, D3. Herein, the corresponding data is forwarded from the unit at the foot of an arrow to the unit at the head of the arrow.

Figure 6:
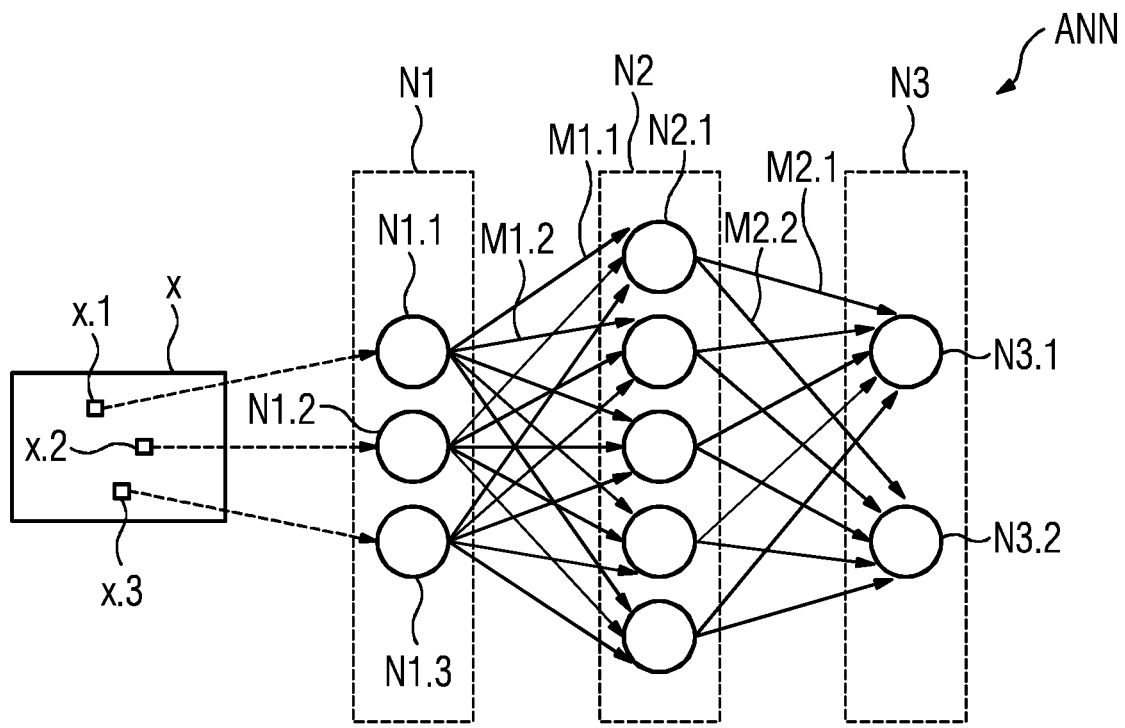
FIG. 6 depicts an artificial neural network.

FIG. 6 shows an example of an image-processing artificial neural network ANN. An artificial neural network ANN consists of nodes N1.1, N1.2, N1.3, N2.1, N3.1, N3.2 and edges M1.1, M1.2, M2.1, M2.2, which start at a start node and and/or end at an end node. For example, the edge M2.1 starts at the start node N1.1 and ends at the end node N2.1. In the exemplary embodiment shown, each node N1.1, N1.2, N1.3, N2.1, N3.1, N3.2 and each edge M1.1, M1.2, M2.1, M2.2 is assigned a numerical value, in particular a real number. The numerical value of an edge M1.1, M1.2, M2.1, M2.2 can be described as an edge weight. In this case, the value of a node N1.1, N1.2, N1.3, N2.1, N3.1, N3.2 depends upon the edge weights of all the edges which have the node as an end node and the node values of the associated start node. In the exemplary embodiment shown, the value ki of a node i is calculated with the formula $$k_i = F\left(\sum_{j \in EG(i)} w_{ij} k_j\right)$$

wherein the sum runs over all nodes j, which are the start node of an edge with j as an end node and wherein ki is the value of the node j and wij is the edge weight of the edge between the nodes i and j. In this example, the function F is the tan h function, but other functions are also possible, for example a step function. Other functional relationships between node values are also possible.

The artificial neural network ANN depicted in the exemplary embodiment has multiple layers N1, N2, N3 of nodes, including an input layer N1, an output layer N3 and a concealed layer N2. The artificial neural network ANN can also comprise a plurality of concealed layers. The input layer comprises input nodes N1.1, N1.2, N1.3; the output layer comprises output nodes N3.1, N3.2. In the exemplary embodiment shown, edges always only connect nodes in adjacent layers, wherein edges only point in one direction (an English technical term for this is "feed forward network"). For example, each edge with a node from the layer N1 has a node from the layer N2 as an end node as a start node. However, it is also possible for edges between non-adjacent layers, in particular within the same layer, to be present or for edges to extend in different directions. Furthermore, it is possible to use artificial neural networks ANN without a layer structure.

The artificial neural network ANN depicted in FIG. 6 is an image-processing artificial neural network ANN containing an image x as an input. In this case, the intensity values of pixels x.1, x.2, x.3 are transferred to the input nodes of the artificial neural network ANN. For purposes of simplification, FIG. 6 only depicts three input nodes N1.1, N1.2, N1.3 for three pixels x.1, x.2, x.3 depicted; an image-processing artificial neural network ANN generally has more input nodes, in particular one input node for each pixel of the input image. The artificial neural network ANN depicted in FIG. 6 comprises two output nodes N3.1, N3.2, wherein the value of the node N3.1 corresponds to the probability of the input image x originating from a set of training images x1, x2, . . . , xN, and wherein the value of the node N3.2 corresponds to the probability of a bone fracture being present in a bone depicted in the image x. It is also possible for the artificial neural network ANN to have the same number of input and output nodes. Such an artificial neural network ANN is suitable for calculating a segmentation of an input image x.

Figure 7:
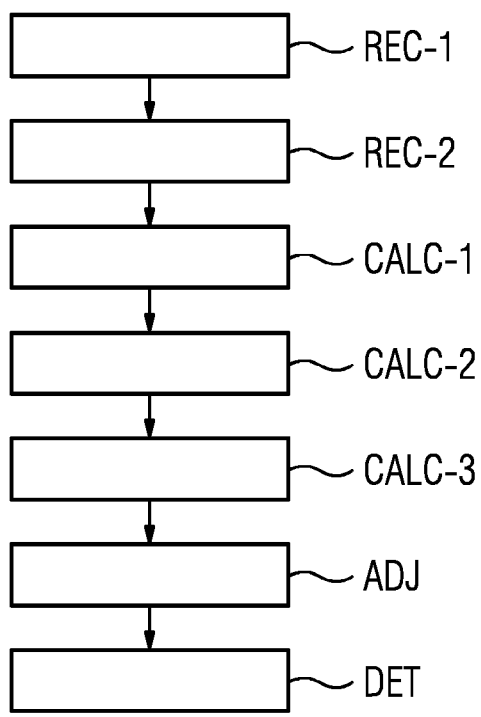
FIG. 7 is a flowchart of first and second exemplary embodiments of the method for the determination of a training function in accordance with the invention.

FIG. 7 a flowchart of the first exemplary embodiment of the method depicted in FIG. 1 and the second exemplary embodiment of the method depicted in FIG. 2. Herein, it is also possible to use a different sequence of method steps than that depicted.

The first step in the flowchart depicted is the first reception REC-1 of a training image x and an item of training-image information i by means of an interface FDU.1, wherein the item of training-image information i is image information for the training image x. Herein, the training image x and the training-image information i are stored in a database TD comprising a plurality of training images x1, x2, ..., xN and items of training image information i1, i2, ..., iN.

The next step in the flowchart depicted is the second reception REC-2 of an isolated item of image information y by means of the interface FDU.1, wherein the isolated item of image information y is independent of the training image x. In the first exemplary embodiment, the isolated image function is generated by a generator IIG; in the second exemplary embodiment, the isolated item of image information y is one of the items of training image information i1, i2, ..., iN from the database TD, wherein the isolated item of image information y is different from the training-image information i.

The next steps in the flowchart depicted are the first calculation CALC-1 of a calculated image G_y by the application of the image-information-processing first function G to the isolated item of image information y by means of a computing unit FDU.2, the second calculation CALC-2 of a first items calculated image information D_x by the application of an image-processing second function D to the training image x by means of the computing unit FDU.2 and the third calculation CALC-3 of a second item of calculated image information D_G_y by the application of the second function D to the calculated image G_y by means of the computing unit FDU.2.

A further step entails the adjustment ADJ of a parameter of the first function G and the second function D based on the first calculated image information D_x and the second item of calculated image information D_G_y (and hence based on the calculated image G_y) by means of the computing unit FDU.2. In the example depicted, the adjustment ADJ is performed by minimizing a cost function by a stochastic gradient method ("stochastic gradient descent") and backpropagation. Alternatively, it is also possible to use other algorithms with backpropagation, for example an adaptive gradient method ("adaptive gradient descent", "AdaGrad") or an "adaptive moment estimation" ("AdaM" for short). However, it is also apply to apply other optimization methods, for example, simulated cooling ("simulated annealing") or the ant colony algorithm ("ant colony optimization").

The last step in the method depicted is the determination DET of a training function TF, wherein here the training function TF is identical to the image-information-processing first function G.

Figure 8:
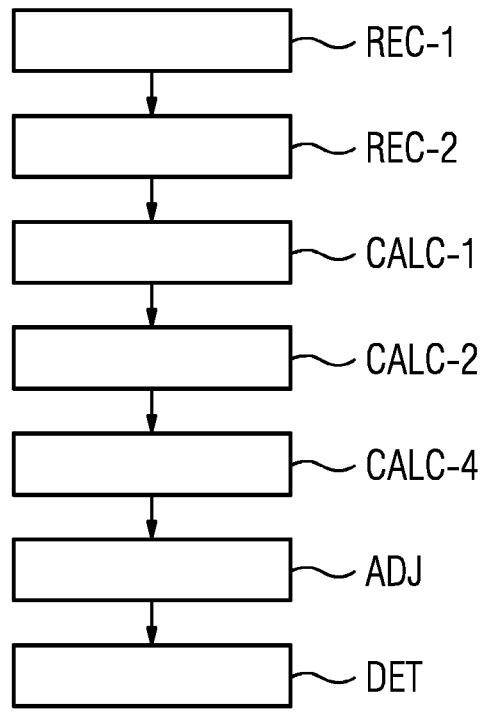
FIG. 8 is a flowchart of a third exemplary embodiment of the method for the determination of a training function.

FIG. 8 shows a flowchart of the third exemplary embodiment of the method depicted in FIG. 4. Herein, it is also possible to use a different sequence of method steps than that depicted. In respect of the elements REC-1 and REC-2 that remain the same, reference is made to the description of the flowchart in FIG. 7. In this exemplary embodiment, the first function G is an information autoencoder, the second function D is an image autoencoder.

The next steps in the flowchart depicted are the first calculation CALC-1 of the first node values G3_y of the central layer G3 of the first function G when applied to the isolated item of image information y by means of the computing unit FDU.2, the second calculation CALC-2 of the second node values D3_x of the central layer D3 of the second function D when applied to the training image x by the processor FDU.2 and the fourth calculation CALC-4 of third node values G3_i of the central layer G3 of the first function G when applied to the training-image information i.

A further step in this exemplary embodiment entails the adjustment ADJ of a parameter of the first function G and the second function D based on the first node values G3_y, the second node values D3_x and the third node values G3_i by means of the processor FDU.2. The adjustment ADJ is performed by minimizing a cost function by backpropagation. In this case, the distance between the first node values G3_y and the second node values D3_x reduces the cost function, the distance between the second node values D3_x and the third node values G3_i increases the cost function. Furthermore, in the exemplary embodiment shown, the distances between the training image x and the output x' of the second function D, the training-image information i and the output i' of the first function G make a positive contribution to the cost function. It is also possible for the distance between the isolated item of image information y and the output y' of the first function G to make a positive contribution to the cost function.

A further step in the method depicted is the determination DET of the training function TF. Here, the training function consists of a concatenation of the layers G1, G2, G3 of the first function G before the central layer G3 thereof with the layers D3, D4, D5 of the second function D after the central layer D3 thereof, wherein the values of the central layer G3 are transferred to the values of the central layer D3.

Figure 9:
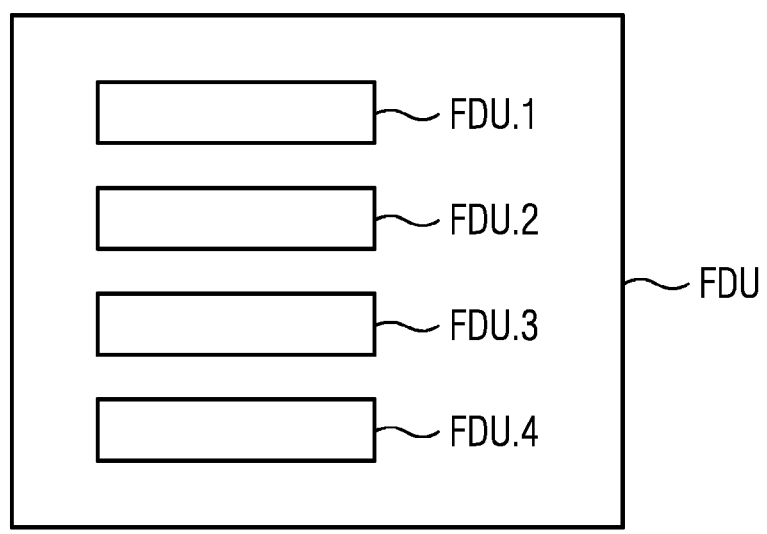
FIG. 9 shows a function-determining computer for the determination of a training function, designed to implement the method according to the invention.

FIG. 9 shows a function-determining computer FDU for the determination of a training function TF. The function-determining unit shown here is configured to carry out a method according to the invention. This determining computer FDU comprises an interface FDU.1, a computing unit FDU.2, a storage unit FDU.3 and an input/output unit FDU.4.

The function-determining computer FDU can be a computer, a microcontroller or an integrated circuit. Alternatively, the function-determining computer FDU can be a real group ("cluster") or virtual group ("cloud") of computers. An interface FDU.1 can be a hardware or software interface (for example a PCI Bus, USB or Firewire). A processor FDU.2 can be formed by hardware or software elements, for example a microprocessor or a so-called FPGA ("field programmable gate array"). A storage unit FDU.3 can be implemented as a non-permanent working memory (random access memory, RAM) or as a permanent mass memory (hard disk, USB stick, SD card, solid state disk). An input/output unit FDU.4 has at least one input unit and/or at least one output unit. In the exemplary embodiment, the input/output unit FDU.4 can be used to input parameters of the method, such as the number of iterations, or to output information on the method, such as an average cost function, to the user.

The storage unit FDU.3 can comprise the database TD with the training images x1, x2, ..., xN and the training image information i1, i2, ..., iN, but the database TD can also be embodied separately from the function-determining unit FDU.

TABLE A

Pseudocode for the first exemplary embodiment

| | |
|---|---|
| A.1 | G.init(G_params_initial) |
| A.2 | D.init(D_params_initial) |
| A.3 | a = 0.01 |
| A.4 | for n from 1 to training_epochs: for each (tr_image, tr_info) in tr_data: |
| A.5 |     calc_info = generate_calc_info( ) |
| A.6 |     calc_image = G.apply_to(calc_info, random_data) |
| A.7 |     rs_tr = D.apply_to(tr_image) |
| A.8 |     D.params -= a*back_prop(D.prob_loss(1, rs_tr.prob) + D.info_loss(tr_info, res_tr.info)) |
| A.9 |     rs_calc = D.apply_to(calc_image) |
| A.10 |     D.params -= a*back_prop(D.prob_loss(0, rs_calc.prob)) |
| A.11 |     rs_calc = D.apply_to(calc_image) |
| A.12 |     G.params -= a*back_prop(G.prob_loss(rs_calc.prob)) |

Table A shows pseudocode for the first exemplary embodiment of the method depicted schematically in FIG. 2. In the lines of code A.1 and A.2, the first function "G" and the second function "D" are initialized as artificial neural networks with standard parameters. The learning speed "a" quantifies the speed of the learning process and is initialized in line A.3.

In A.4, a loop with "trainings_epochs" iterations is defined via a counting variable "n" and a loop over all pairs of training images "tr_image" and training image information "tr_info" in the training data "tr_data". Herein, "trainings_epochs" is a predefined whole number describing the number of training cycles.

In the lines of code A.5 and A.6, an isolated item of image information "calc_info" is generated without recourse to the training image information. Then, a calculated image "calc_image" is generated from the isolated item of image information "calc_info" and random numbers "random_data" by means of the first function "G".

In the lines of code A.7 and A.9, the results "rs_tr" and "rs_calc" of the application of the image-processing second function "D" to the training image "tr_image" and the calculated image "calc_image" are determined. The results "rs_tr" and "rs_calc" comprises the probabilities "rs_tr.prob" and "rs_calc.prob" of the training image "tr_image" and the calculated image "calc_image" being contained in the training data "tr_data". Furthermore, the results "rs_tr" and "rs_calc" comprise the estimated probabilities "rs_tr.info" and "rs_calc.info" of bone depicted in the image having a fracture.

In the lines of code A.8 and A.10, the parameters "D.param" of the second function "D" are adjusted in that the cost function is minimized by means of backpropagation. These lines of code should be understood as meaning that the function "back_prob" contains not only the values of the cost function as input but also the values of the partial derivatives of the cost function required for the for the backpropagation. In the line of code A.8, the cost function is made up of the component "prob_loss", which measures the difference of the probability of an image being containing in the training data, and the component "info_loss", which measures the difference between the estimated image information and the actual image information. Herein, the use of the additive component "info_loss" is optional. In the exemplary embodiment shown, both parts of the cost function are defined by binary cross entropy but obviously other functional relationships for the cost function are conceivable, for example quadratic distance.

In the lines of code A.11, the result "rs_calc" is calculated again by applying the second function "D" to the calculated image "calc_image". Herein, the result "rs_calc" can differ from the probability calculated in A.9 since in line of code A.10 the parameters of the first function "D" were adjusted. In the line of code A.12, the cost function "G.prob_loss" is calculated and the parameters "G.param" of the first function "G" are adjusted by backpropagation of the cost function taking account of the learning speed "a".

In this exemplary embodiment, a logarithmic cost function defined as $G.loss(x)=\log(x)$ is used as a cost function of the first function "G". However, other cost functions are also conceivable which have the result that the value of the cost function is maximum in the interval between 0 and 1 for $x=1$.

TABLE B

Pseudocode for the second exemplary embodiment

| | |
|---|---|
| B.1 | G.init(G_params_initial) |
| B.2 | D.init(D_params_initial) |
| B.3 | a = 0.01 |
| B.4 | for n from 1 to training_epochs: for each (tr_image, tr_mask) in tr_data: |
| B.5 |     other_mask = choose_other_info(tr_data, tr_mask) |
| B.6 |     calc_image = G.apply(other_mask, random_data) |
| B.7 |     pred_mask_tr = D.apply(tr_image) |
| B.8 |     D.params -= a*back_prop(D.loss(pred_mask_tr, tr_mask)) |
| B.9 |     pred_mask_calc = D.apply(calc_image) |
| B.10 |     D.params -= a*back_prop(D.loss(pred_mask_calc, tr_mask)) |
| B.11 |     pred_mask_calc = D.apply(calc_image) |
| B.12 |     G.params -= a*back_prop(G.loss(pred_mask_calc, tr_mask)) |

Table B depicts pseudocode implementing the second exemplary embodiment of the method depicted in FIG. 3. In the pseudocode, the work is performed with two-dimensional images, but it is also applicable to images with three and more dimensions. The image information for a two-dimensional image is a mask marking a region of interest in the image, for example a defined organ.

As before, a two-dimensional image can be described by a collection of N×M pixels with an intensity value or grey tone. Therefore, an image is simultaneously a vector in an M·N-dimensional vector space.

A mask of this image, or equivalently the segmentation of a region of interest is then also an image with N×M pixels, wherein the value of a pixel is 0 if the pixel lies outside the region of interest and wherein the value of a pixel is 1 if the pixel is within the region of interest. Therefore, a mask can also be described as a vector in an M·N-dimensional vector space, wherein the vector only has the entries 0 and 1.

The lines of code B.1 to B.4 correspond to the lines of code A.1 to A.4 in Table A. Here, the training data consists of a training image "tr_image" and an associated mask "tr_mask". In the line of code B.5, an isolated segmentation "other_mask", which is not identical to the training segmentation "tr_mask", is selected from the training data "tr_data".

In the line of code B.6, the first function "G" generates a calculated image "calc_image" from the mask "tr_mask" and additional random data. In line B.7, the second function "D" determines a mask "pred_mask_tr" from the training image "tr_image" and, in line B.8, parameters "D.params" of the second function "D" are adjusted by backpropagation of the difference cost function between "pred_mask_tr" and "tr_mask". Furthermore, in line B.9, the second function "D" determines a mask "pred_mask_synth" from the calculated image "calc_image" and, in line B.10, parameter "D.params" of the second function "D" are adjusted by backpropagation of the difference cost function between "pred_mask_synth" and "tr_mask".

In the lines of code B.11 and B.12, a mask "pred_mask_tr" is calculated again from the training image "tr_image" by means of the ANN "D", wherein here this produces another mask since the parameters "D.params" of the first function "D" have changed and the parameters "G.params" of the first function "G" have been adjusted by backpropagation of the difference cost function between "pred_mask_synth" and "tr_mask".

Any distance function that calculates the distance of the two inputs x and y can be used as the cost function "loss(x,y)" of the image-processing second function "D" and the image-information-processing first function "G". In this exemplary embodiment, the Sørensen-Dice coefficient SD(x,y) of a vector or a mask x and a vector or mask y is used for the cost function of the image-processing second function D. In this exemplary embodiment, the "sum of squared differences" (an English technical term; SSD for short) of two entries x and y is used as the cost function of the image-information-processing first function G.

TABLE C

| | Pseudocode for the third exemplary embodiment |
|---|---|
| C.1 | G.init_autoencoder(G_params_initial) |
| C.2 | D.init_autoencoder(D_params_initial) |
| C.3 | a = 0.01 |
| C.4 | for n from 1 to training_epochs: for each (tr_image, tr_info) in tr_data: |
| C.5 |    other_info = choose_other_info(tr_data, tr_info) |
| C.6 |    tr_image_rcstr = D.apply(tr_image) |
| C.7 |    loss_D = distance(tr_image, tr_image_rcstr) + reg |
| C.8 |    tr_info_rcstr = G.apply(tr_info) |
| C.9 |    loss_G = distance(tr_info, tr_info_rcstr) + reg |
| C.10 |    nodes_tr_image = D.central_nodes(tr_image) |
| C.11 |    nodes_tr_info = G.central_nodes(tr_info) |
| C.12 |    nodes_other_info = G.central_nodes(other_info) |
| C.13 |    loss_nodes = distance(nodes_tr_image, nodes_tr_info) − distance(nodes_tr_image, nodes_other_info) |
| C.14 |    D.params −= a*back_prop(loss_D + loss_G + loss_nodes) |
| C.15 |    G.params −= a*back_prop(loss_D + loss_G + loss_nodes) |

The effect of lines of code C.1 to C.4 corresponds to that of the lines of code A.1 to A.4. Here, the variable "G" is an information autoencoder, here the variable "D" is an image autoencoder. In line of code C.5, an isolated item of image information "other_info" that does not correspond to the training-image information "tr_info" is selected from the training data "tr_data".

In the lines of code C.6 and C.7, the image autoencoder "D" is applied to the training image "tr_image" in order to generate a reconstructed training image "tr_image_rcstr". The contribution "loss_D" of the image autoencoder "D" to the total cost function is calculated from the distance between the training image "tr_image" and the reconstructed training image "tr_image_rcstr". The calculation includes the addition of a term "reg" for regularization, which is dependent upon the parameters of the image autoencoder "D" and in particular can be calculated as the L2-norm for all parameters, in particular the edge weights, of the image autoencoder "D".

In the lines of code C.8 and C.9, the information autoencoder "G" is applied to the training-image information "tr_info" in order to generate a reconstructed training-image information "tr_info_rcstr". The contribution "loss_G" of the image autoencoder "G" to the total cost function is calculated from the distance between the training-image information "tr_info" and the reconstructed training-image information "tr_info_rcstr". The calculation includes the addition of a term "reg" for regularization, which is dependent upon the parameters of the image autoencoder "G" and in particular can be calculated as the L2-norm for all parameters, in particular the edge weights, of the image autoencoder "G".

In the lines of code C.10 to C.12, the values "nodes_tr_image", "nodes_tr_info" and "nodes_other_info" of the central nodes of the autoencoders "D" and "G" are calculated when applied to the training image "tr_image", the training-image information "tr_info" and the isolated item of image information "other_info". The contribution "loss_nodes" to the total cost function is obtained in line of code C.13 as the difference between the distance of the node values "nodes_tr_image" and "nodes_tr_info" and the distance of the node values "nodes_tr_image" and "nodes_other_info". It is optionally possible for other factors to be included in this calculation.

The backpropagation of the total cost function made up of the sum of the contributions "loss_D", "loss_G" and "loss_nodes" results in the adjustment of the parameters of the autoencoders "D" and "G" in the lines of code C.14 and C.15.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for determining a training function, comprising:
   in a computer, receiving a first reception of a training image and an item of training-image information via an interface of the computer, wherein the training-image information is image information for the training image;
   in said computer, receiving a second reception of an isolated item of image information via the interface, wherein the isolated item of image information is not an image and is independent of the training image;
   in said computer, making a first calculation of a calculated image of a generator function when applied to the isolated item of image information, wherein the isolated item of image information is not an image, and an output of the generator function is an image that has at least two dimensions and is associated with the isolated item of image information;
   in said computer, making a second calculation of a first item of calculated image information of a classification function when applied to the training image;
   in said computer, making an adjustment of a parameter of at least one of the generator function or the classification function, based on at least the calculated image and the first item of calculated image information; and
   in said computer, making a determination of a training function based on the generator function.

2. The method as claimed in claim 1, wherein at least one of the generator function or the classification function is provided by an artificial neural network, and wherein the parameters of the artificial neural network comprise edge weights of the artificial neural network.

3. The method as claimed in claim 2, wherein the adjustment comprises adjusting the edge weights by minimizing a cost function by execution of backpropagation.

4. The method as claimed in claim 1, wherein said item of image information of an image comprises segmentation of the image into at least one image region.

5. The method as claimed in claim 1, wherein said item of image information of an image comprises a variable that assesses whether a defined object or a plurality of defined objects are depicted in the image.

6. The method as claimed in claim 1,
   wherein the method further comprises making a third calculation in the computer of a second item of calculated image information by applying the calculation function to the calculated image.

7. The method as claimed in claim 6,
   wherein the first item of calculated image information comprises an estimation of a first probability of the training image being contained in a set of training images; and
   wherein the second item of calculated image information comprises an estimation of a second probability of the calculated image being contained in a set of training images.

8. The method as claimed in claim 7,
   wherein at least one of the generator function or the clasification function is provided by an artificial neural network, and wherein the parameters of the artificial neural network comprise edge weights of the artificial neural network;
   wherein the adjustment comprises adjusting the edge weights by minimizing a cost function by execution of backpropagation; and
   wherein the cost function is based on at least a first difference of the first item of calculated image information from the training-image information.

9. The method as claimed in claim 8, wherein the cost function is furthermore based on at least a second difference of the second item of calculated image information from the isolated item of image information.

10. The method as claimed in claim 1,
    wherein at least one of the generator function or the classification function is provided by an artificial neural network, and wherein the parameters of the artificial neural network comprise edge weights of the artificial neural network;
    wherein the generator function is an information autoencoder that, when applied to a first item of image information, generates a second item of image information as said output;
    wherein the classification function is an image autoencoder that, when applied to a first image, generates a second image as said output;
    wherein a central layer of the information autoencoder and a central layer of the image autoencoder have a same number of central nodes;
    wherein the calculated image corresponds to first node values;
    wherein the first node values are values of the nodes of the central layer of the information autoencoder when the isolated item of image information is the input value of the information autoencoder;
    wherein the first item of calculated image information corresponds to second node values;
    wherein the second node values are values of the nodes of the central layer of the image autoencoder when the training image is the input value of the image autoencoder;
    wherein the method further comprises making a further calculation of further node values that are values of the nodes of the central layer of the information autoencoder when the training-image information is the input value of the information autoencoder; and
    wherein the training function is composed of the first part of the information autoencoder with the second part of the image autoencoder.

11. The method as claimed in claim 10,
    wherein at least one of the generator function or the classification function is provided by an artificial neural network, and wherein the parameters of the artificial neural network comprise edge weights of the artificial neural network;

wherein the adjustment comprises adjusting the edge weights by minimizing a cost function by execution of backpropagation; and wherein a distance between the first node values and the second node values makes a negative contribution to the cost function and wherein a distance between the second node values and the third node values makes a positive contribution to the cost function.

12. The method as claimed in claim 10, wherein:

the training function generates an image as an output value from an item of image information as an input value such that an item of image information is used as an input value of the information autoencoder;

the node values of the central layer of the information autoencoder are transferred to the node values of the central layer of the image autoencoder; and the output value of the training function corresponds to the resulting output value of the image autoencoder.

13. A function-determining computer, comprising:

a processor;

an interface that receives a first reception of a training image and an item of training-image information into said processor, wherein the training-image information is image information for the training image;

said interface also receiving a second reception of an isolated item of image information into said processor, wherein the isolated item of image information is independent of the training image;

said processor being configured to make a first calculation of a calculated image of an generator function when applied to the isolated item of image information, wherein the isolated item of image information is not an image, and an output of the generator function is an image that has at least two dimensions and is associated with the isolated item of image information;

said processor being configured to make a second calculation of a first item of calculated image information of a classification function when applied to the training image;

said processor being configured to make an adjustment of a parameter of at least one of the generator function or the classification function, based on at least the calculated image and the first item of calculated image information; and said processor being configured to make a determination of a training function based on the generator function.

14. A non-transitory, computer-readable data storage medium encoded with programming instructions, said storage medium being loaded into a computer and said programming instructions causing said computer to:

receive a first reception of a training image and an item of training-image information via an interface of the computer, wherein the training-image information is image information for the training image;

receive a second reception of an isolated item of image information via the interface, wherein the isolated item of image information is independent of the training image;

make a first calculation of a calculated image of an generator function when applied to the isolated item of image information, wherein the isolated item of image information is not an image, and an output of the generator function is an image t hat has at least two dimensions and is associated with the isolated item of image information;

make a second calculation of a first item of calculated image information of a classification function when applied to the training image;

make an adjustment of a parameter of at least one of the generator function or the classification function, based on at least the calculated image and the first item of calculated image information; and make a determination of a training function based on the generator function.

* * * * *